United States Patent [19]
Lin et al.

[11] Patent Number: 5,634,727
[45] Date of Patent: Jun. 3, 1997

[54] BOTTOM BRACKET BEARING ASSEMBLY FOR A BICYCLE

[76] Inventors: Jing-Chen Lin, No. 173, Kuei Suei Street; Ming-Chang Lin, No. 66, Huai An Street, both of Kaohsiung City, Taiwan

[21] Appl. No.: 557,936

[22] Filed: Nov. 14, 1995

[51] Int. Cl.⁶ .................. F16C 19/50; G05G 1/14
[52] U.S. Cl. ............................ 384/545; 74/594.2
[58] Field of Search ................ 384/545; 74/594, 74/594.1, 594.2

[56] References Cited

U.S. PATENT DOCUMENTS

| | | | |
|---|---|---|---|
| 582,750 | 5/1897 | Leaycraft | 74/594.2 |
| 3,903,754 | 9/1975 | Morroni | 74/594.1 |
| 4,201,120 | 5/1980 | Segawa | 74/594.2 |
| 5,209,581 | 5/1993 | Nagano | 384/545 |
| 5,223,885 | 6/1993 | Lin et al. | 384/545 X |

*Primary Examiner*—Thomas R. Hannon
*Attorney, Agent, or Firm*—Morton J. Rosenberg; David I. Klein

[57] ABSTRACT

A bottom bracket bearing for a bicycle is provided which includes an axle, a pair of ball bearings, a flanged cup, and an adjusting cup disposed within a five-way tube. The axle has a reducing quadrangle extending from both ends thereof, and a continuation area between the quadrangle portion an a cylindrical portion of the axle, and has a flat circular flange formed adjacent the cylindrical portion. A joint-packing is positioned against the flat circular flange, the thickness of the joint-packing extending at least 1 mm beyond the flat end of the flanged cup, thereby substantially preventing the crank with the chain wheels from contacting the flanged cup.

2 Claims, 9 Drawing Sheets

BOTTOM BRACKET BEARING ASSEMBLY FOR A BICYCLE

BACKGROUND OF THE INVENTION

1. Field of the Invention

The present invention relates to a bottom bracket bearing assembly for a bicycle, and more particularly to a frame for easily mounting the chain wheel with a crank on it.

2. Prior Art

A conventional bottom bracket assembly as shown in FIG. 4A, includes an axle sleeve A, an axle A1, balls A2, ball seat A3 and nuts A4. All of those parts are mounted in a five-way tube A5, as shown in FIG. 4B. In practice, it has been found that the conventional assembly has some shortcomings. That assembly is difficult to mount, the parts easily loosen and fall out, due to the combination not sealing fully. Because of high accuracy required for the parts, the production and the assembly is difficult and unsuited for normal production.

Subsequently, a new axle frame with two flanges was developed to improve on the above-mentioned shortcomings. As shown in FIG. 5A, this second prior art assembly comprises an axle B, an axle sleeve B1, ball bearings B2, B3, flanged cup B4, adjusting cup B5, five-way tube B6 and ring B7. The assembly of those parts is shown in FIG. 5B. The axle B has two flanges B01 and B02 formed thereon, one of a bigger diameter and the other of a smaller diameter. In assembly, the larger diameter flange B01 is set in a caulking groove B11 of the axle sleeve B1, and the smaller flange B02 is set in a shaft bore B12 of the axle sleeve B1. Along with the other parts, the axle sleeve B1 is retained within five-way tube B6 for securing the axle B tightly in the combination and further for improving the mounting accuracy and reducing the production-cost of the assembly.

Therefore, the problems of the conventional bottom bracket bearing seem to be solved, but in practice, a new problem is found. One head of the axle B joins with an assembly of a crank and a chain wheel. Referring to FIGS. 5A and 5B, the two heads of the axle B are shown to be a reducing quadrangle, the continuation area between the reducing quadrangle and the cylindrical portion of the axle is formed by four tapers. The function of the quadrangle is to secure the assembly of the crank and the chain wheels, as shown in FIG. 6A. There are, however, some big problems associated therewith.

The chain wheels C are fastened on the crank D, and a through-hole D1 is formed in one end of the crank D for securement to the quadrangular head of the axle B. The assembly of the chain wheels C and the crank D is fastened on the axle B at the end of the quadrangular head, and the crank D is made of an alloy that is softer than the axle B. The through-hole D1 of the crank D is formed smaller than the axle B, and it is secured on the tapers of the axle B by a nut E from the end of said quadrangular head. But, corresponding to the different magnitude of force applied when tightening the nut E, the crank D is secured on the axle in different positions, to cause the base line of the chain wheels C to be out of alignment. That alignment error allows the chain to jump off the chain wheels C during running or when changing speed, which is one of the problems with that assembly.

A second problem results form the fact that the material of the crank D is softer than the axle's material. After pressing against the tapers for some time, the through-hole D1 of the crank D becomes enlarged to form a tapered hole from the side corresponding to the tapers of the axle, causing the chain wheels C to shake on the head of the axle B, as shown in FIG. 6A. Further, that condition may cause the chain wheels C to touch against the flanged cup B4 and cause damage.

Another problem is seen during repair of the assembly, as when the assembly of the crank D and the chain wheels C or the axle unit B fail and are taken apart from each other. During manufacture, the crank D is pressed on the axle B, the tapered hole of the through-hole D1 being pressed on the axle's tapers tightly. The through-hole D1 is thereby enlarged and when installed again it will axially approach the flanged cup. If the repairman uses excessive force during threading of the nut, or disassembly and mounting of the crank, many times, the chain wheels C will touch against the flanged cup on the axle B, as shown in FIG. 6B. Such contact blocks the rotation of crank D, causing damage to the crank D.

SUMMARY OF THE INVENTION

The present invention provides a bottom bracket bearing assembly for a bicycle, which includes an axle, ball bearings, a flanged cup and an adjusting cup. The axle has a pair of axially spaced flanges, each with a circular arc formed on both sides thereof. A reducing quadrangle extends from each end of the axle, and a continuation area is disposed between the quadrangle and the cylindrical portion of the axle and is formed with two pairs of tapers. Two ball bearings are respectively mounted on the outer side of the two axle flanges. The flanged cup and the adjusting cup are mounted on the axle, on opposing ends thereof, with their respective male threads retaining the axle in the five-way tube of the bicycle. A circular bead is formed at the base portion of the tapers, adjacent the side where the assembly of the crank and the chain wheels is mounted. A flat circular flange is disposed adjacent the cylindrical portion of the axle and a flat segment extends between the tapers. A joint-packing is mounted against the flat circular flange, the thickness of the joint-packing being about the same as the length of the tapers. The outer side of the joint-packing should extend slightly beyond the flat end of the flanged cup, so that the crank assembly cannot come into contact with the flanged cup.

DESCRIPTION OF THE PREFERRED EMBODIMENT

Figure 1:
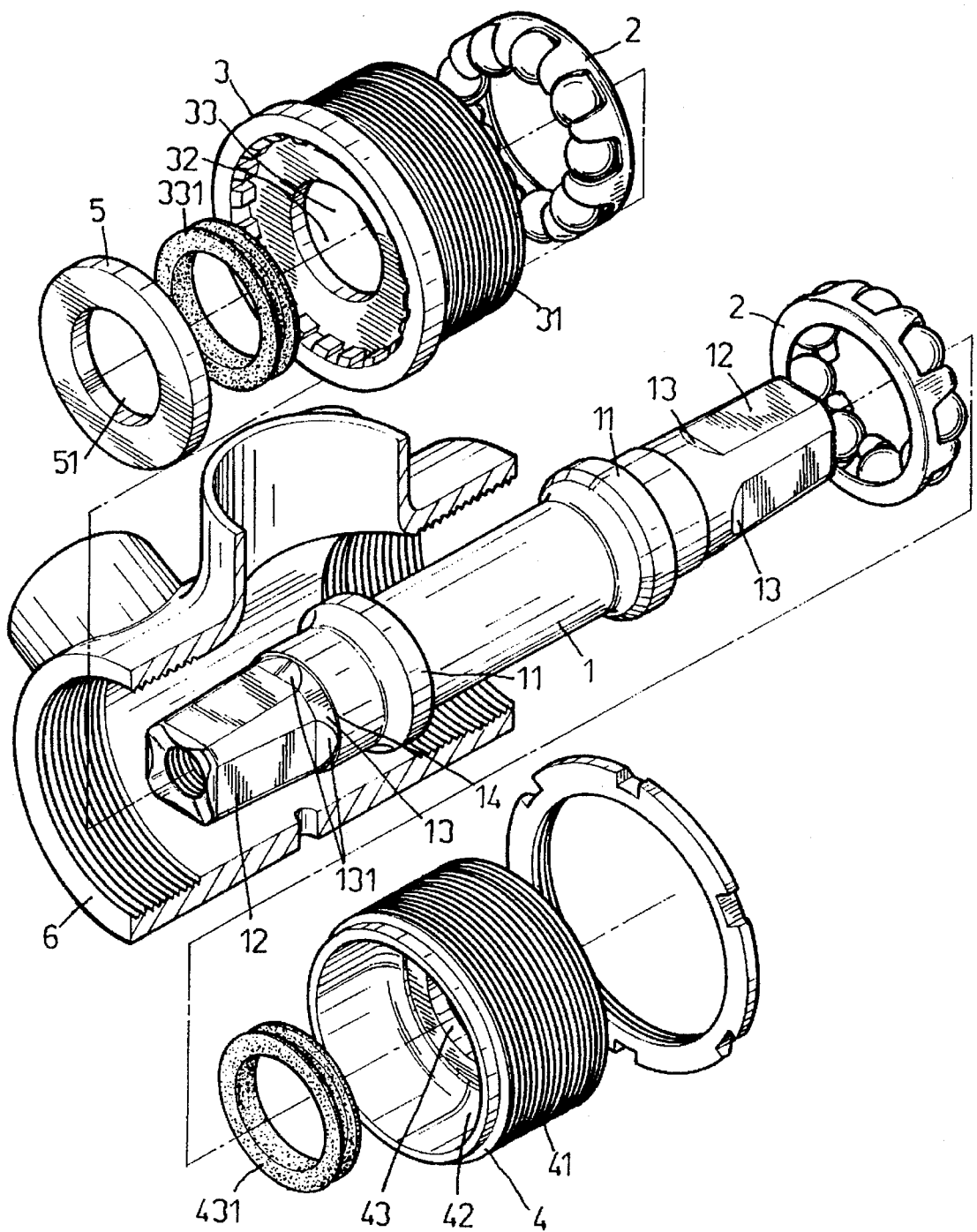
FIG. 1 is a perspective view of the present invention.

Referring to FIG. 1, the present invention is shown to include an axle 1, ball bearings 2, a flanged cup 3, an adjusting cup 4 and joint-packing 5. All of those parts are assembled within a five-way tube 6 of a bicycle.

The axle 1 is cylindrical with a pair of separate axially spaced flanges 11 formed thereon, each flange 11 having a circular arcuate surface formed on both sides thereof. A reducing quadrangle 12 extends from each end of axle 1, with the continuation area between the quadrangle 12 and the cylindrical portion of the axle being in the form of a circular bead with a flat segment 13 and two pairs of tapers 131 formed thereon, and a flat circular flange 14 formed adjacent the cylindrical portion of axle 1. The ball bearings 2 include a plurality of balls held in a ball retainer.

The flanged cup 3 and the adjusting cup 4 each have external surfaces formed with male threads 31 and 41, and internal surfaces formed with counter bores 32 and 42, respectively. The flanged cup 3 and adjusting cup 4 each have shaft holes 33 and 43 formed therein, and rubber sealing rings 331 and 431 are respectively secured thereto.

The joint-packing 5 has a shaft hole 51 formed centrally therethrough. The diameter of shaft hole 51 being about equal to the outside diameter of the portion of axle 1 having the flat segment 13 and the tapers 131. The thickness of joint-packing 5 being equal to the length of the flat segment 13 and the tapers 131.

Figure 2:
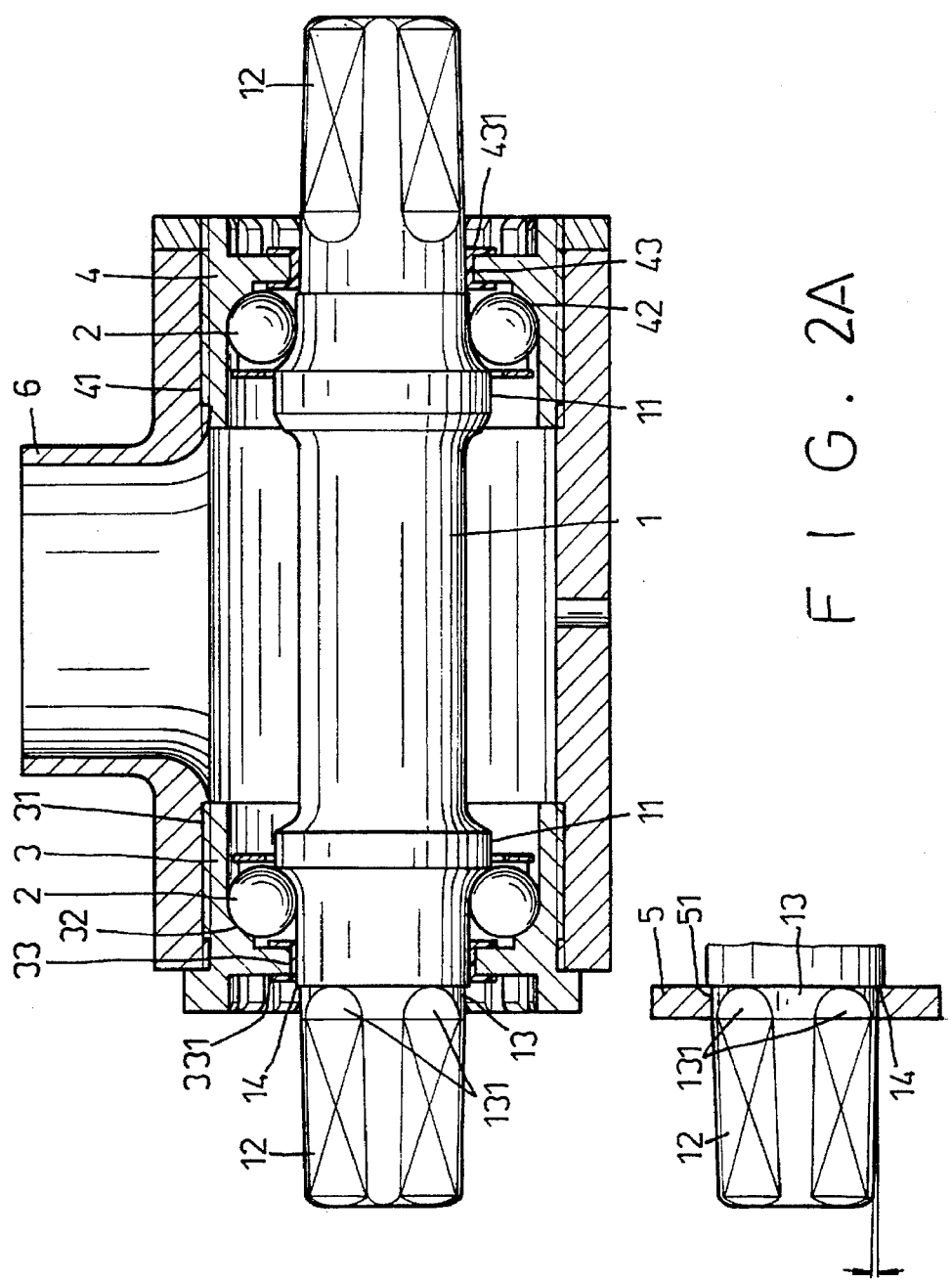
FIG. 2A is a cross-section view of the present invention.
FIG. 2B is a side view showing a part of the present invention.
Figure 3:
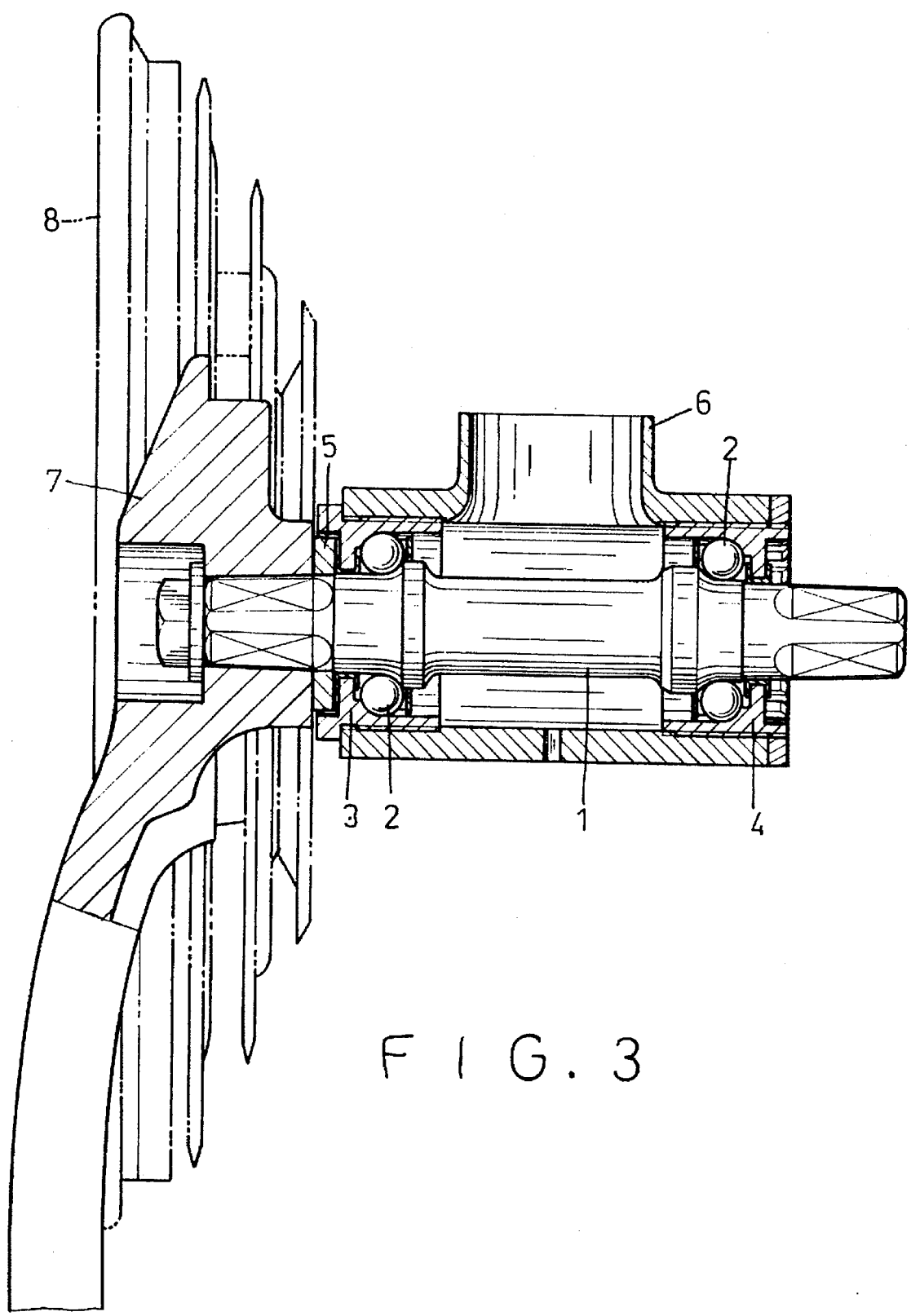
FIG. 3 is a cross-section view showing use of the present invention.
Figure 4A:
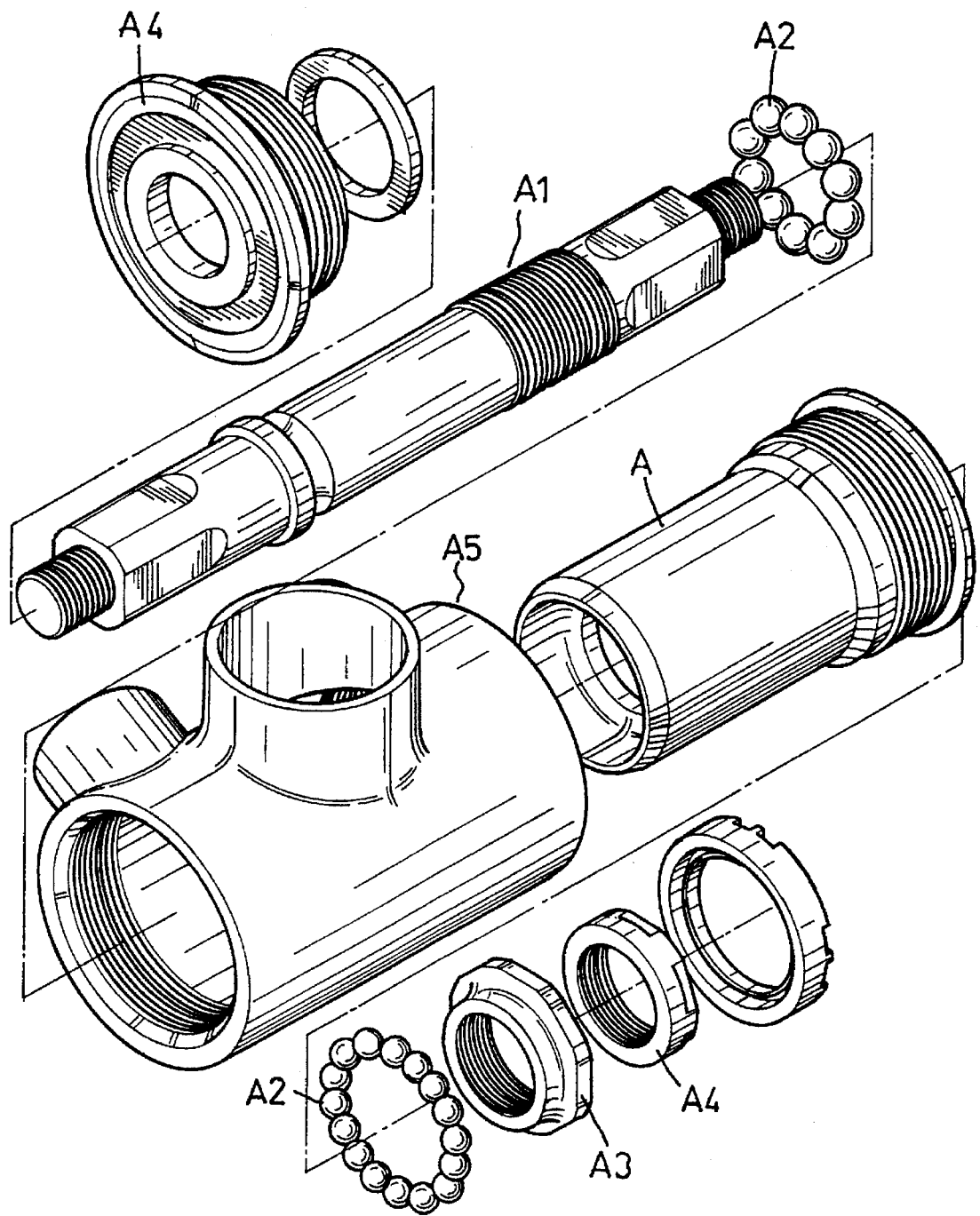
FIG. 4A is a perspective view of the conventional bottom bracket bearing A.
Figure 4B:
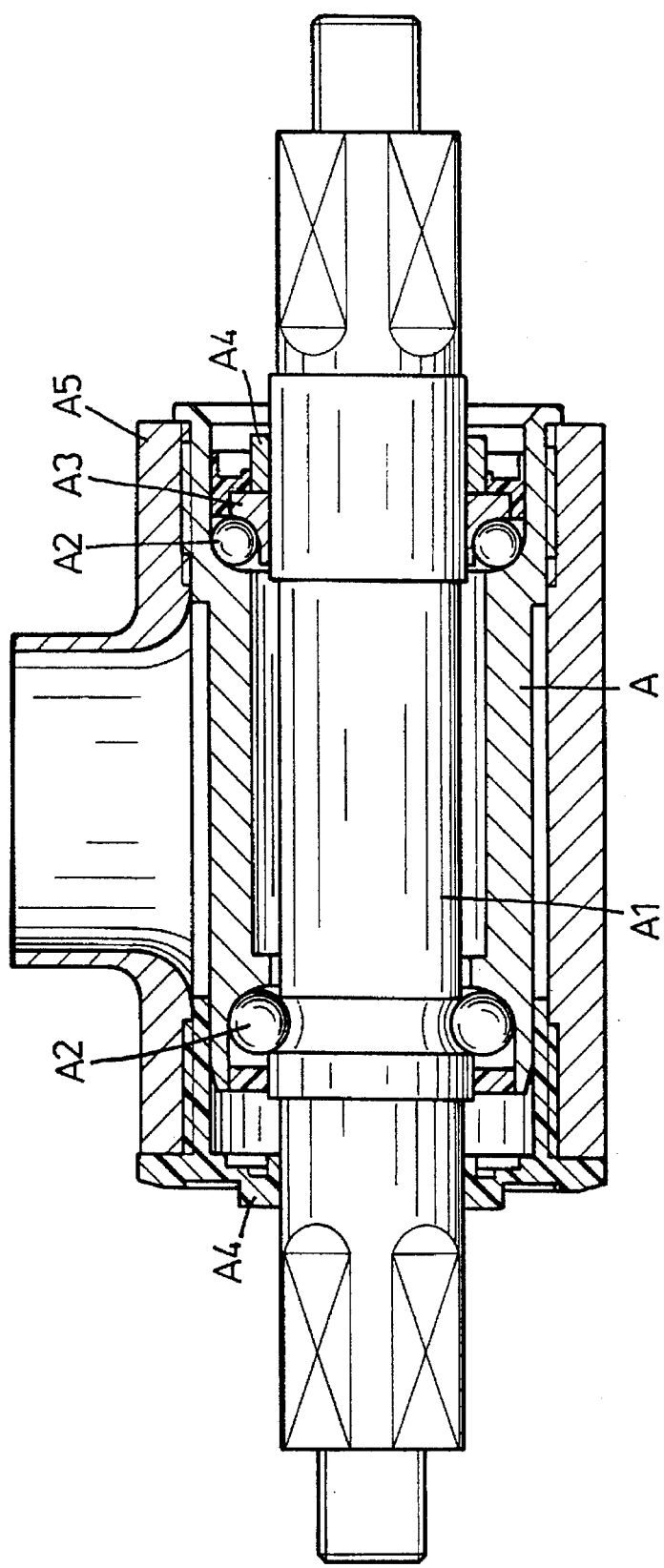
FIG. 4B is a cross-section view of FIG. 4A.
Figure 5A:
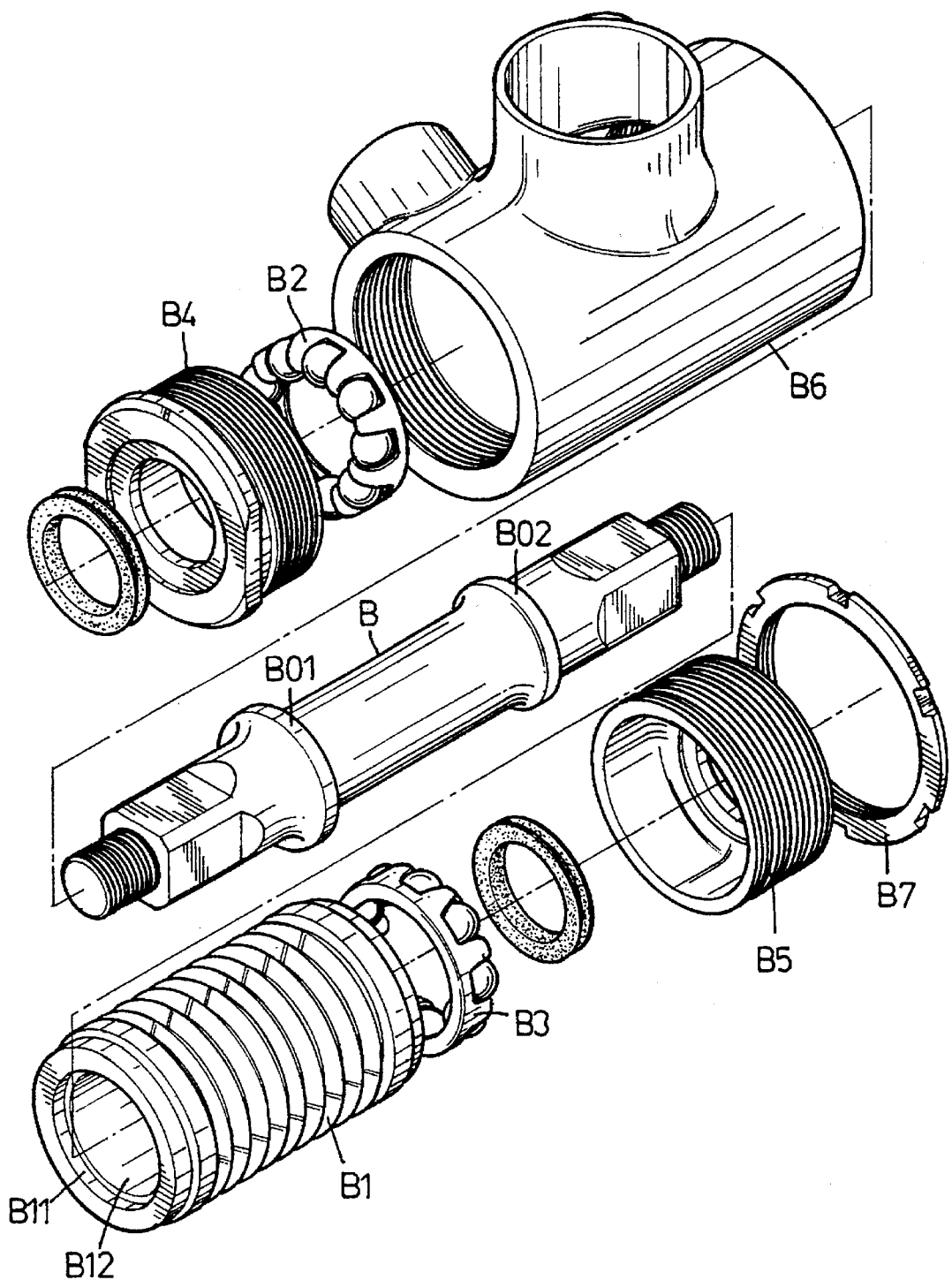
FIG. 5A is a perspective view of a conventional bottom bracket bearing B.
Figure 5B:
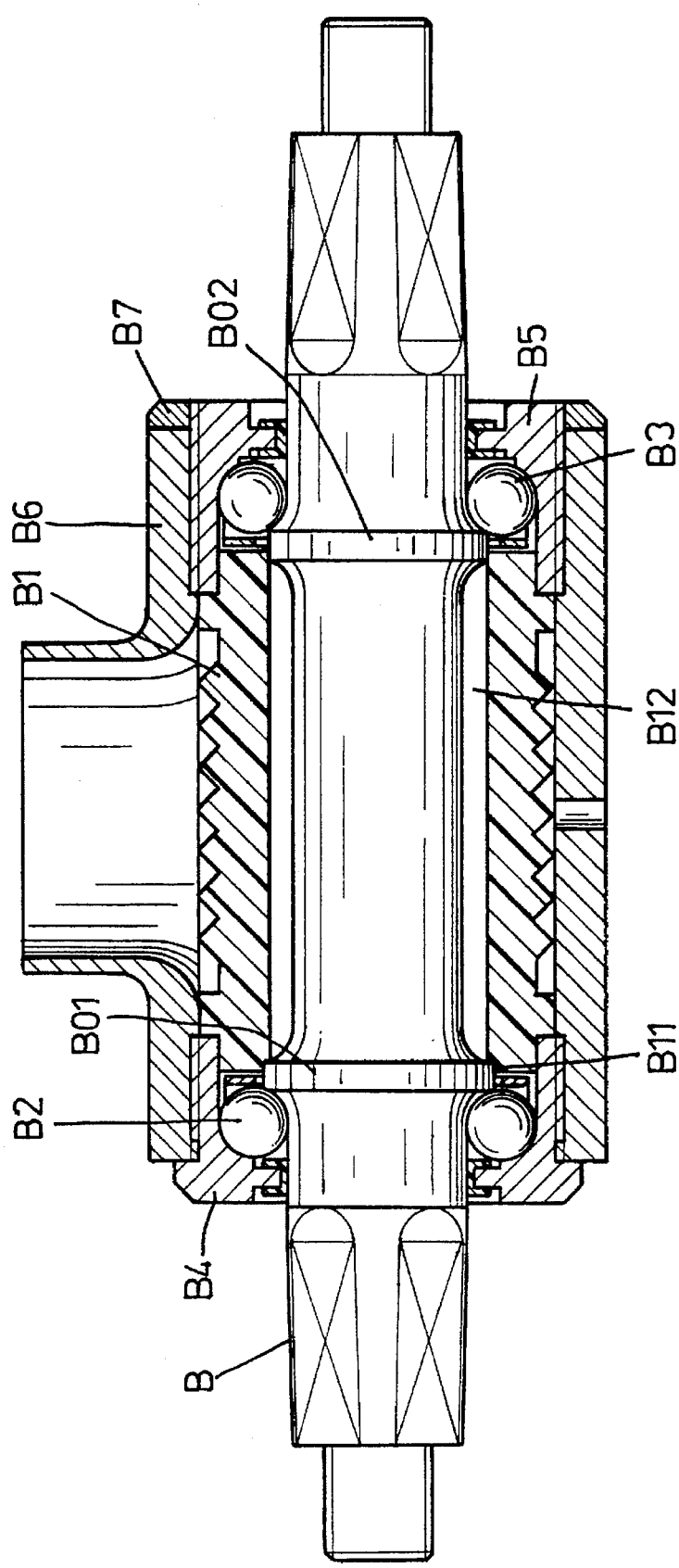
FIG. 5B is a cross-section view of FIG. 5A.
Figure 6A:
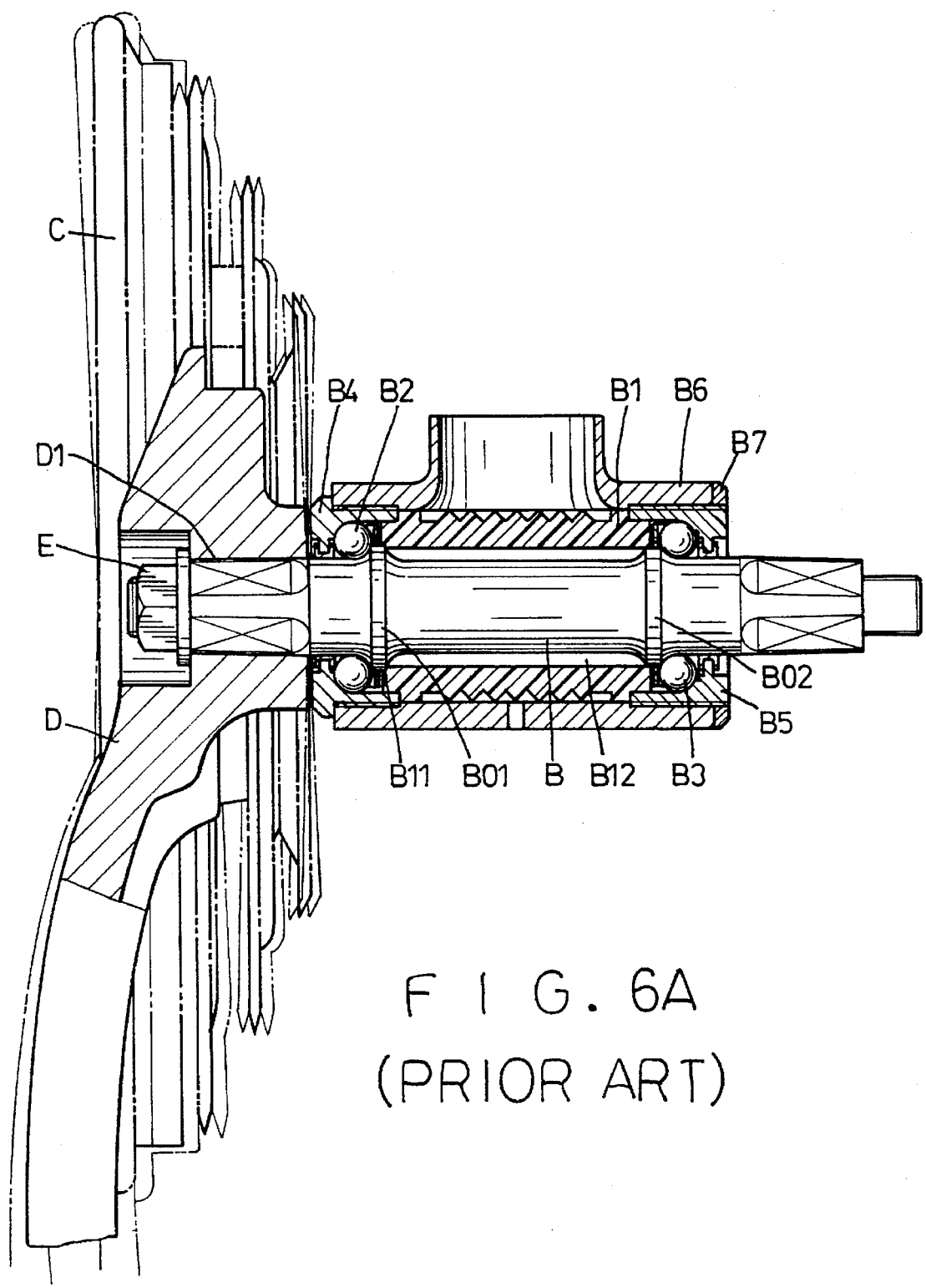
FIG. 6A is a cross-section view showing a first state of an assembly of chain-wheels with the conventional bottom bracket bearing B; and, FIG. 6B is a cross-section view showing a second state of an assembly of chain-wheels with the conventional bottom bracket bearing B.
Figure 6B:
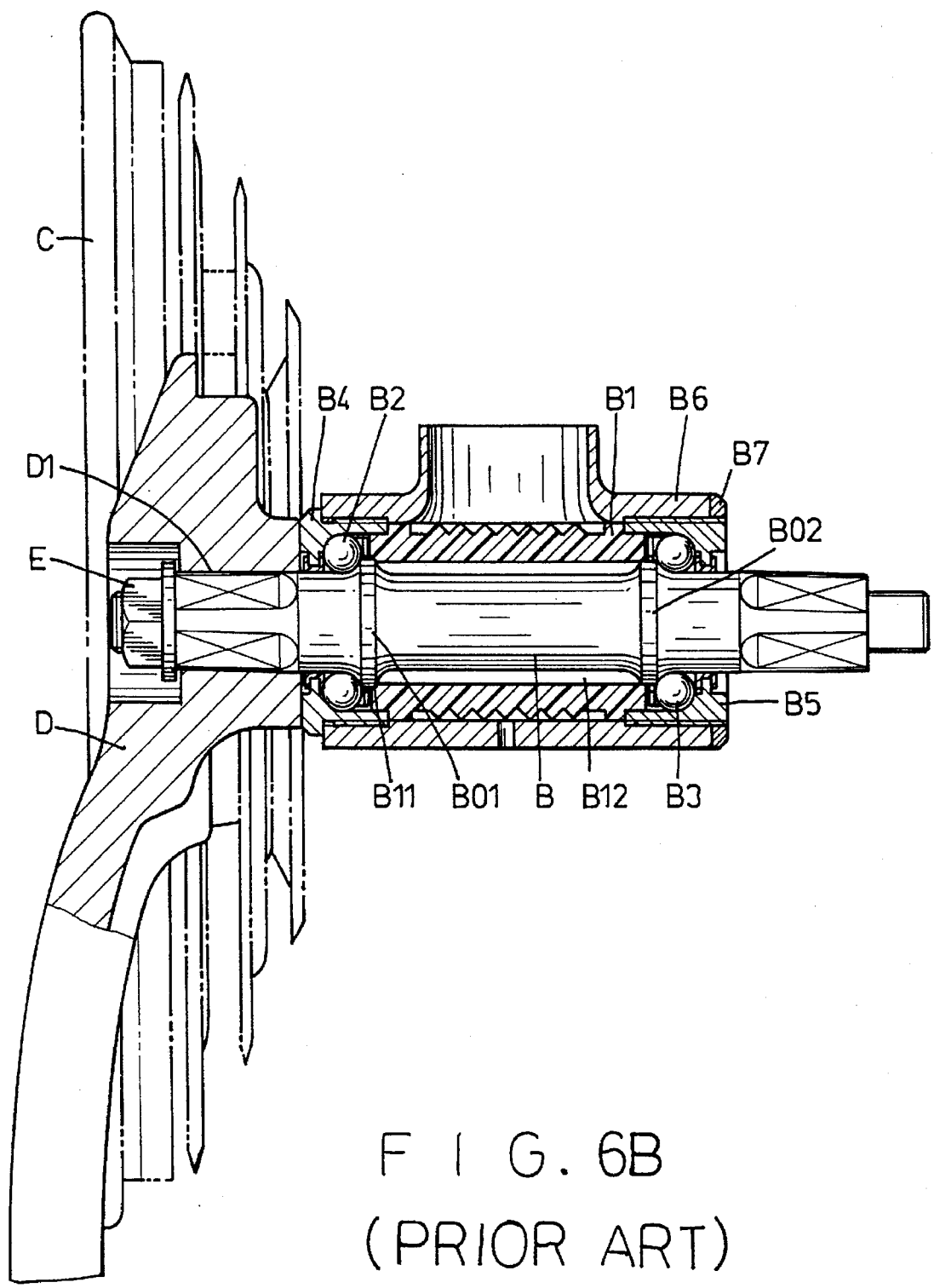

In the assembly, as shown in FIGS. 2A and 2B, the two ball bearings 2 are set on said axle I from the two ends thereof and are disposed against the outside circular arcuate surfaces of the flanges 11, respectively. Next, the flanged cup 3 and adjusting cup 4 are set on the axle 1 and retain the ball bearings 2 in respective counter bores 32 and 42, while holding all of the above-mentioned parts in the five-way tube 6 by engagement of their male threads therewith. Lastly, the joint-packing 5 is set on the flat segment 13 of the axle 1, against the flat circular flange 14. The opposing side of the joint-packing 5 extends beyond, by at least 1 mm, the flat end portion of the flanged cup 3. When mounting the alloy crank 7 with the chain wheels 8 on one head of said axle 1, as shown in FIG. 3, the outside flat of said joint-packing 5 provides a locating surface for the mounting and securement of the crank 7.

We claim:

1. A bottom bracket bearing assembly for a bicycle disposed within a tubular portion of the bicycle and adapted for coupling to a bicycle crank and gear assembly, comprising:

a longitudinally extended axle positioned within and extending through opposing first and second outer ends of the tubular portion of the bicycle, said axle having a cylindrically shaped portion with a pair of longitudinally spaced first flanges formed thereon, each of said first flanges having opposing arcuate sides, said axle having a pair of quadrangularly shaped opposing end portions and a pair of continuation areas disposed between said cylindrical portion and each said quadrangularly shaped end portions, each said continuation area being defined by (a) a second flange disposed adjacent said cylindrical portion of said axle and having a flat outer facing side, (b) two pairs of tapered areas extending between said second flange and said quadrangularly shaped end portion, and (c) a plurality of flat segment areas respectively disposed between adjacent ones of said tapered areas;

a pair of ball bearing assemblies respectively disposed on said axle adjacent an outer facing side of said flanges, each of said pair of ball bearing assemblies including a plurality of balls held in a retainer;

a flanged cup member threadedly engaged in the first outer end of the tubular portion of the bicycle and having a centrally disposed through opening for passage of one end of said axle therethrough, said flanged cup member having a counter bore surrounding said through opening formed in a outer end thereof;

an adjusting cup member threadedly engaged in the second outer end of the tubular portion of the bicycle and having a centrally disposed through opening for passage of a respective end of said axle therethrough, said adjusting cup member having a counter bore surrounding said through opening formed in a outer end thereof;

a pair of rubber sealing rings, each of said sealing rings being mounted in a respective one of said through openings of said flanged cup member and said adjusting cup member; and, a joint-packing member disposed within said counter bore of said flanged cup member and having a through opening formed centrally therein for passage of one of said quadrangularly shaped end portions therethrough for coupling to the bicycle's crank and gear assembly, said joint-packing member having a thickness substantially equal to a length dimension of said tapered and flat segment areas and extending from said counter bore a predetermined distance beyond an outer edge portion of said flanged cup member for preventing the bicycle's crank and gear assembly from contacting said outer edge portion of said flanged cup member.

2. The bottom bracket bearing assembly as recited in claim where said predetermined distance said joint-packing member extends beyond said outer edge portion of said flanged cup member is at least 1.0 mm.

* * * * *